United States Patent Office 3,127,264
Patented Mar. 31, 1964

3,127,264
NON-FERROUS RECOVERY PROCESS
Henry J. Tschirner and Lester A. Williams, Kansas City, Mo., assignors, by mesne assignments, to Sherritt Gordon Mines Limited, Toronto, Ontario, Canada, a company of Canada
No Drawing. Filed Feb. 16, 1961, Ser. No. 89,670
6 Claims. (Cl. 75—108)

This invention relates to an improved hydrometallurgical method of separating impurities, such as lead and tin, from a solution which contains also dissolved values of at least one other non-ferrous metal which are to be recovered from the solution substantially free from impurities. The method is specifically directed to an improvement in the process in which a metal selected from the group consisting of silver, copper, nickel and cobalt is precipitated from a solution in which it is present as a dissolved salt by reacting the solution with a reducing gas at elevated temperature and under superatmospheric pressure.

Methods are known and are in commercial use in which values of non-ferrous metals are extracted from metal bearing material and are dissolved in a leach solution from which they are ultimately recovered as product metals suitable for use in industry, such as by electrolysis or by reacting the solution with a sulphur-free reducing gas at elevated temperature and pressure.

Also, processes are now known in which a metal selected from the group consisting of silver, copper, nickel and cobalt can be precipitated from a solution in finely divided form and substantially free from impurities by reacting a solution in which the metal is present as a dissolved salt with a sulphur-free reducing gas at elevated temperature and pressure.

A problem is encountered in the production of metals of the group silver, copper, nickel and cobalt substantially free from impurities from solutions which contain lead and/or tin. The problem is that while salts of lead and tin, such as the carbonate and sulphate salts, normally are considered as insoluble in and report in the undissolved residue in conventional ammoniacal-ammonium salt leaching processes, it is found, in actual practice, that some lead and/or tin is dissolved in the solution or is present in the solution as a colloid which cannot be separated from the solution by known liquid-solids separation procedures. As an example of this problem, it is found in leaching copper bearing scrap metals which contain, also, lead and/or tin, with an ammoniacal ammonium carbonate leach solution, substantial quantities of lead and/or tin are dissolved or are present in colloidal condition in the solution. The same phenomenon is noted in the use of ammoniacal ammonium sulphate leach solutions. Lead and/or tin, which is present in the solution as a dissolved salt or in colloidal form tends to precipitate with the metal of interest and thus contaminates its purity. This problem is particularly acute in the treatment of metal bearing material for the economic production of a product, non-ferrous metal which contains less than 0.01% lead and/or tin, by weight.

There is, therefore, a definite need for an economic method for separating impurities, and particularly lead and/or tin, from a solution which is to be treated for the recovery of a product metal of the group silver, copper, nickel and cobalt, substantially free from impurities.

The improved method of this invention is described in detail as applied to the production of product copper metal substantially free from impurities from copper bearing scrap metal, such as used automobile radiators, which contains, also, impurities such as lead and tin, in which an aqueous ammoniacal ammonium carbonate solution having a pH value within the range of from about pH 7 to about pH 12, preferably from about pH 9 to about pH 12, is employed as the leach solution. After purification, the solution is reacted with hydrogen at elevated temperature and pressure to precipitate copper as product metal in finely divided state and substantially free from impurities. It will be understood that the method can be employed with advantage in the production of other metals of the group silver, copper, nickel and cobalt from other types of leach solutions derived from leaching other types of metal bearing material and other methods, such as electrolysis, can be employed to recover the desired metal from the solution.

Copper bearing scrap material can be leached with an aqueous ammoniacal ammonium carbonate solution, usually at a temperature above 35° C., for example, from about 35° to 50° C.

Heretofore, however, it has not been possible to separate impurities such as lead, tin, iron and chromium and traces of other metals which constitute contaminants from the solution. It has been necessary to remove such contaminants from the copper product metal after it has been separated from the solution by washing the copper with an aqueous acetic acid solution. There has been no completely satisfactory procedure by means of which impurities such as those described above can be separated from a solution in which they are present as dissolved or colloidal salts.

We have found that problems heretofore associated with the production of a metal of the group silver, copper, nickel and cobalt substantially free from impurities can be overcome by treating the solution, prior to the product metal precipitation step, with a small amount, preferably at least about 6 grams per litre, of finely divided celestite.

Celestite, strontium sulphate, which is employed in the improved method of this invention is readily available in commercial quantities. It occurs in nature in sedimentary rocks and can be produced synthetically by known chemical processes. It is added to the solution in finely divided form, preferably of a particle size within the range of from 40 to 150 microns.

The operation of the improved method of this invention is described in detail as part of an overall process for the recovery of product metal copper from copper bearing scrap metal which contains, also, lead, tin, iron, chromium, nickel and traces of other metals.

Initially, the copper scrap is leached with an ammoniacal ammonium carbonate solution wherein the free ammonia is present in a concentration of from about 120 to about 180 grams per litre of solution and the carbon dioxide concentration is from about 70 to 130 grams per litre. The solution is preferably heated to and maintained at a temperature of from about 35° to 50° throughout the leaching step. Solution is retained in the leaching step to produce a pregnant leach solution which contains from about 120 to 180 grams of dissolved copper per litre of solution. Preferably air is fed into the solution throughout or periodically during the leaching step to produce and maintain a ratio of cuprous to cupric ions in the solution of from about 2 to 1. Impurities such as lead, tin, iron, chromium, nickel and traces of other metals may be, and usually are, present in the final solution, depending on the nature of the scrap metal treated.

Leach solution from the leaching step can be filtered to separate entrained solids or it can be passed directly without the intervening liquid-solids separation step to the purification step which constitutes the present improvement. In the purification step of the overall process, pregnant leach solution is fed into a reaction vessel, such as an agitated tank, wherein it is reacted, with agitation, with added celestite. We have found that from about 5 to about 20, preferably from about 10 to about 15 grams of celestite should be provided for each gram of lead plus tin contained in the solution. The solution is actively agitated at ambient temperature, for example, from 35° to 50° C., for about an hour, during which lead, tin and other contaminants, such as iron, chromium and nickel are substantially completely precipitated from the solution. The treated solution is then passed to a liquid-solids separation step, such as a filtration or centrifuging step, for the separation of solids from the solution.

It is found in the operation of the solution purification step that the addition to the solution of a filter aid facilitates and expedites the liquid-solids separation step. The addition of from about 1 to 2 grams of diatomaceous earth per litre of solution serves as a satisfactory filter aid. It will be understood, however, that the addition of diatomaceous earth does not take part in the precipitating action. It acts merely as a filter aid. The process is operable without the use of a filter aid and other known filter aids can be employed.

As a reasonable explanation of the phenomenon which takes place in the purification step, it is believed that lead and tin contained in the solution enter into the crystal structure of the celestite. Therefore, it is preferred to conduct the purification step at ambient temperature or slightly above, for example, from 35° to 50° C., within which range from about 94% to 98% of the lead and tin initially present in the solution are precipitated and separated therefrom during the purification treatment.

Precipitated impurities, celestite and filter aid are separated from the solution in the liquid-solids separation which follows the purification treatment. The solution is then in condition for the recovery of the dissolved copper by a known procedure.

The following examples illustrate the results which can be obtained from the improved process of this invention in the precipitation of lead from an ammoniacal ammonium carbonate solution which contained dissolved lead values. All percentages are by weight unless otherwise indicated. The added celestite had a density of 1.10 grams per cc. and was of a particle size smaller than 100 microns.

Example 1

3.4 grams of strontium carbonate, $SrCO_3$, were reacted in 100 ml. of 7% $H_2SO_4$ solution. Precipitated strontium sulphate was separated from the solution and washed free of acid. Wet precipitate was added at room temperature to a litre of ammoniacal ammonium carbonate solution which contained 125 grams per litre of copper and 0.86 gram per litre of lead. The solution was agitated for one hour. A sample was taken and was found to contain 0.027 gram per litre of lead.

Example 2

Example 1 was repeated with the difference that the precipitated strontium sulphate was dried prior to adding to the solution. At the end of one hour agitation, the solution was found to contain 0.025 gram per litre of lead.

Example 3

5 grams per litre of celestite were added to an ammoniacal ammonium carbonate solution which contained about 125 grams per litre of copper and 1.07 grams per litre of lead. At the end of 5 hours of agitation, the solution contained 0.92 gram per litre of lead.

Example 4

Example 3 was repeated with the difference that 6 grams of celestite were added per litre of solution. At the end of one hour agitation, the solution contained 0.1 gram per litre of lead.

Example 5

Example 3 was repeated with the difference that 10 grams per litre of celestite was added to the solution. At the end of 2 hours' agitation, the solution contained 0.028 gram per litre of lead.

Examples 3, 4 and 5 indicate that at least about 6 and preferably about 10 parts of celestite should be provided for each part of lead present in the solution.

The following examples illustrate the effect of temperature on the precipitating reaction.

Example 6

10 grams per litre of celestite were added to a solution which contained 125 grams per litre copper and 0.96 gram per litre of lead. The solution was agitated for 15 minutes at 50° C. at the end of which the lead content was reduced to 0.013 gram per litre. At the end of 60 minutes agitation, the solution contained 0.03 gram per litre of lead.

Example 7

Example 6 was repeated with the difference that the solution was agitated at a temperature of 35° C. The solution at the end of 15 minutes agitation contained 0.006 gram per litre of lead.

These experiments indicate that satisfactory removal of lead from the solution is obtained by operating the process at a temperature of from about 35° to about 50° C.

In the overall process of which the present method is an improvement, purified and clarified solution is charged into a reaction vessel, such as an autoclave, and the temperature of the solution is raised to about 175° C.

Hydrogen at about 1000 pounds per square inch gauge pressure is fed into the reaction vessel in amount sufficient to maintain a partial pressure of hydrogen of about 175 pounds per square inch. The reducing reaction requires from about 60 to 90 minutes. On completion of the reducing reaction, precipitated copper metal, which is in finely divided state, is separated from the solution, such as by filtration or by centrifuging. Copper product metal particles are dried by passing them through a muffle furnace at an elevated temperature under a reducing atmosphere of hydrogen.

It is to be understood that the present method can be employed also to purify an electrolyte used for the electrodeposition of metal in an electrolytic process. The electrolyte should be filtered after treatment with the celestite to remove the precipitated lead and tin and thus preclude the electrodeposition of lead or tin with the metal of interest on the cathode during the electrolytic operation.

Although celestite in various forms can be employed, it is preferred to use it in finely divided form, in which form it is commercially available.

The improved method of this invention has the important advantage of efficiently removing lead and/or tin from leach solutions without appreciable co-precipitation of the metal of interest. The treatment is effective, rapid and relatively inexpensive.

It will be understood, of course, that modifications can be made in the preferred embodiment of the method described herein without departing from the scope of the invention as defined by the appended claims.

What we claim as new and desire to protect by Letters Patent of the United States is:

1. A process of treating an aqueous alkaline ammoniacal-ammonium salt solution containing a dissolved value of at least one metal selected from the class consisting of lead and tin to precipitate said metal from solution which comprises: adding finely divided, water insoluble strontium sulfate to said solution and agitating the resultant slurry whereby said one metal is precipitated from solution.

2. A process of separating at least one metal selected from the class consisting of lead and tin from an aqueous alkaline ammoniacal-ammonium salt solution containing in addition to said metal, at least one other non-ferrous metal selected from the class consisting of silver, copper, nickel and cobalt, which comprises: adding finely divided water insoluble strontium sulfate to said solution and agitating the resultant slurry whereby said one metal is precipitated from solution free of said other non-ferrous metal.

3. A process according to claim 2 in which at least about 5 grams of strontium sulfate per gram of said one metal are added to said solution.

4. A process according to claim 2 in which said finely divided strontium sulfate has a particle size range of about 40–150 microns.

5. A process of separating at least one metal selected from the class consisting of lead and tin from a copper-bearing aqueous alkaline ammonical-ammonium carbonate solution which comprises: adding to said solution at least about 5 grams of water insoluble strontium sulfate having a particle size range of about 40–150 microns per gram of said one metal and agitating the resultant slurry whereby said one metal is precipitated substantially free of copper.

6. A process according to claim 5 in which about 10–15 grams of strontium sulfate are added per gram of said one metal.

References Cited in the file of this patent
UNITED STATES PATENTS
2,923,618    Redemann et al. _____ Feb. 2, 1960